(12) United States Patent
Lee et al.

(10) Patent No.: US 10,306,710 B2
(45) Date of Patent: May 28, 2019

(54) COOKING TOOL, INTERWORKING SYSTEM BETWEEN THE COOKING TOOL AND KITCHEN APPLIANCES, AND CONTROL METHOD OF THE COOKING TOOL INTERWORKING WITH THE KITCHEN APPLIANCES

(71) Applicant: LG ELECTRONICS INC., Seoul (KR)

(72) Inventors: Sangcheol Lee, Seoul (KR); Wontae Kim, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 15/205,764

(22) Filed: Jul. 8, 2016

(65) Prior Publication Data

US 2017/0013681 A1    Jan. 12, 2017

(30) Foreign Application Priority Data

Jul. 9, 2015    (KR) .................. 10-2015-0097921

(51) Int. Cl.
| | |
|---|---|
| *H05B 6/06* | (2006.01) |
| *A47J 36/00* | (2006.01) |
| *A47J 27/62* | (2006.01) |
| *H05B 6/12* | (2006.01) |
| *A47J 36/32* | (2006.01) |
| *A47J 45/07* | (2006.01) |

(52) U.S. Cl.
CPC .............. *H05B 6/062* (2013.01); *A47J 27/62* (2013.01); *A47J 36/00* (2013.01); *A47J 36/32* (2013.01); *H05B 6/1209* (2013.01); *A47J 45/071* (2013.01); *H05B 2213/06* (2013.01); *H05B 2213/07* (2013.01)

(58) Field of Classification Search
CPC ...... A47J 27/62; A47J 45/068; A47J 2202/00; A47J 36/32; A47J 37/10; A47J 27/002; A47J 36/00; A47J 37/00; A47J 37/0713; A47J 37/0786; A47J 43/28; A47J 45/071
USPC .............. 99/342, 421 TP, 325, 331, DIG. 14, 99/329 R, 341, 422, 485
See application file for complete search history.

(56) References Cited

U.S. PATENT DOCUMENTS 2,971,041 A * 2/1961 France .................. G01K 1/146
                                                                        136/234
5,441,344 A * 8/1995 Cook, III ................ A47J 43/28
                                                                        374/141
(Continued)

FOREIGN PATENT DOCUMENTS

JP    2010-238586      10/2010
KR    10-2005-0079961    8/2005
(Continued)

*Primary Examiner* — Ibrahime A Abraham
*Assistant Examiner* — Chris Q Liu
(74) *Attorney, Agent, or Firm* — Fish & Richardson P.C.

(57) ABSTRACT

A cooking tool is disclosed, which comprises a fastening portion detachably provided in a cooking vessel provided above or inside a kitchen appliance to cook food; a sensor sensing a temperature of food which is cooked in the cooking vessel; a transmitter transmitting temperature information sensed by the sensor to the kitchen appliance as an electric signal; and a controller controlling the transmitter to transmit the temperature information sensed by the sensor as an electric signal.

6 Claims, 7 Drawing Sheets

(56) References Cited

U.S. PATENT DOCUMENTS

| | | | | |
|---|---|---|---|---|
| 2002/0018401 | A1* | 2/2002 | Vassallo | A47J 36/32 |
| | | | | 368/11 |
| 2004/0016348 | A1* | 1/2004 | Sharpe | A47J 37/10 |
| | | | | 99/331 |
| 2004/0163548 | A1* | 8/2004 | Pacenti | A47J 45/068 |
| | | | | 99/403 |
| 2005/0285735 | A1* | 12/2005 | Imura | A47J 27/62 |
| | | | | 340/539.27 |
| 2008/0110910 | A1* | 5/2008 | Kleppin | A47J 45/071 |
| | | | | 220/759 |
| 2009/0183729 | A1* | 7/2009 | Barkhouse | A47J 27/62 |
| | | | | 126/39 BA |
| 2011/0044370 | A1* | 2/2011 | Schochet | A47J 43/283 |
| | | | | 374/155 |
| 2012/0000903 | A1* | 1/2012 | Baarman | A47J 27/002 |
| | | | | 219/620 |

FOREIGN PATENT DOCUMENTS

| | | |
|---|---|---|
| KR | 10-2014-0047703 | 4/2014 |
| KR | 10-1427895 | 8/2014 |
| WO | 2004/095994 | 11/2004 |

* cited by examiner

COOKING TOOL, INTERWORKING SYSTEM BETWEEN THE COOKING TOOL AND KITCHEN APPLIANCES, AND CONTROL METHOD OF THE COOKING TOOL INTERWORKING WITH THE KITCHEN APPLIANCES

CROSS-REFERENCE TO RELATED APPLICATION

This application claims the benefit of the Korean Patent Application No. 10-2015-0097921, filed on Jul. 9, 2015, which is hereby incorporated by reference as if fully set forth herein.

TECHNICAL FIELD

The present disclosure relates to a cooling tool, an interworking system between the cooking tool and kitchen appliances, and a control method of the cooking tool interworking with the kitchen appliances.

BACKGROUND

A cooking tool refers to a composite word of a cooking machine used to cook food and a cooking utensil. A kitchen appliance refers to a machine or tool used or arranged in the kitchen. For example, the cooking tool includes a microwave oven, a gas range, and a frying pan, and the kitchen appliance includes a hood, a dishwasher, etc. as well as a cooling tool used in the kitchen.

Recently, consumers who directly make food at home instead of eating out considering health care have been increased. However, since consumers who are not skilled cooks do not know a proper temperature of food which is cooked, a problem may occur in that the consumers may burn food or make food be insufficiently cooked. Since most of the consumers cook food by using electricity or gas, the risk of fire may occur when the food is burned.

SUMMARY

Accordingly, the present invention is directed to a cooling tool, an interworking system between the cooking tool and kitchen appliances, and a control method of the cooking tool interworking with the kitchen appliances, which substantially obviate one or more problems due to limitations and disadvantages of the related art.

An object of the present invention is to provide a cooking tool that may cook food at a proper temperature or for a proper time depending on a type of food.

Another object of the present invention is to provide a cooking tool that may allow a consumer to know a cooking temperature of food which is cooked or a cooking time of food which is cooked.

Other object of the present invention is to provide a cooking tool that may uniformly maintain a cooking temperature of food which is cooked or control a cooking time of food which is cooked.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cooking tool of the present invention comprises a fastening portion detachably provided in a cooking vessel provided above or inside a kitchen appliance to cook food; a sensor sensing a temperature of food which is cooked in the cooking vessel; a transmitter transmitting temperature information sensed by the sensor to the kitchen appliance as an electric signal; and a controller controlling the transmitter to transmit the temperature information sensed by the sensor as an electric signal.

Also, the kitchen appliance includes a receiver receiving the electric signal transmitted from the transmitter and a kitchen appliance controller controlling cooking intensity of food, and the controller controls the transmitter to transmit the sensed temperature information to the receiver of the kitchen appliance to allow the kitchen appliance controller to control cooking intensity of food.

The sensor is provided as a thermocouple. The thermocouple further includes a length control member controlling a length of the thermocouple to be in contact with food which is cooked.

Meanwhile, the fastening portion further includes an extension portion extended therefrom to serve as a handle.

Also, the cooking tool further comprises a display module controlled by the controller to display cooking information of food.

Also, the cooking tool further comprises an input module for allowing a user to input cooking information, wherein the controller controls intensity of cooking provided from the kitchen appliance through the cooking information input by the input module.

Moreover, the kitchen appliance includes a coil generating an induced magnetic field by supplying a current, and a power supply controlling intensity of the current flowing in the coil, and the kitchen appliance controller controls cooking intensity by controlling intensity of the current flowing in the coil by controlling the power supply.

In this case, the cooking vessel is made of a material that flows an induced current by means of an induced magnetic field, or the cooking tool comprises a grill provided inside the cooking vessel and made of a material that flows an induced current by means of an induced magnetic field.

In another aspect of the present invention, an interworking system between a kitchen appliance and a cooking tool comprises the cooking tool including a fastening portion detachably provided in a cooking vessel for cooking food, a sensor sensing a temperature of food which is cooked in the cooking vessel, a transmitter transmitting temperature information sensed by the sensor to the kitchen appliance as an electric signal, and a controller controlling the transmitter to transmit the temperature information sensed by the sensor as an electric signal; and the kitchen appliance including a receiver provided with the cooking tool thereabove or thereinside, receiving the electric signal transmitted from the transmitter, and a kitchen appliance controller controlling cooking intensity of food, wherein the controller controls the transmitter to transmit the sensed temperature information to the receiver of the kitchen appliance and therefore the kitchen appliance controller controls cooking intensity of food.

The interworking system is characterized in that the sensor is provided as a thermocouple. The thermocouple further includes a length control member controlling a length of the thermocouple to be in contact with food which is cooked.

Meanwhile, the fastening portion further includes an extension portion extended therefrom to serve as a handle.

The interworking system further comprises a display module controlled by the controller to display cooking information of food.

The interworking system further comprises an input module for allowing a user to input cooking information, wherein the controller controls intensity of cooking provided from the kitchen appliance through the cooking information input by the input module.

Meanwhile, the kitchen appliance includes a coil generating an induced magnetic field by supplying a current, and a power supply controlling intensity of the current flowing in the coil, and the kitchen appliance controller controls cooking intensity by controlling intensity of the current flowing in the coil by controlling the power supply.

In this case, the cooking vessel is made of a material that flows an induced current by means of an induced magnetic field, or the interworking system comprises a grill provided inside the cooking vessel and made of a material that flows an induced current by means of an induced magnetic field.

In other aspect of the present invention, a control method of a cooking tool attached to a cooking vessel arranged above or inside a kitchen appliance to cook food, interworking with the kitchen appliance comprises the steps of sensing a temperature of food which is cooked in the cooking vessel; transmitting the sensed temperature of food to the kitchen appliance as an electric signal; and controlling cooking intensity of food in the kitchen appliance by receiving the electric signal.

The control method further comprises the step of allowing a user to input cooking information of food.

In this case, the control method further comprises the step of comparing a cooking temperature input at the step of allowing a user to input cooking information of food with a cooking temperature measured at the sensing step, wherein the electric signal is transmitted in accordance with the compared result at the transmitting step to control cooking intensity of food in the kitchen appliance.

Also, if the input cooking temperature is higher than the measured temperature of food, the electric signal is transmitted to the kitchen appliance together with a signal of temperature increase.

If the input cooking temperature is lower than the measured temperature of food, the electric signal is transmitted to the kitchen appliance together with a signal of temperature drop.

The control method further comprises the step of comparing a cooking time input at the step of allowing a user to input cooking information of food with a measured cooking time, wherein, if the measured cooking time is longer than the input cooking time, the electric signal is transmitted to the kitchen appliance together with a cancellation signal at the transmitting step.

If the electric signal including the cancellation signal is received in the kitchen appliance, supply of energy (heat, electromagnetic wave, etc.) from the kitchen appliance to the cooking vessel is stopped.

According to the present invention, the cooking tool, which may cook food at a proper temperature or for a proper time depending on a type of food, may be provided.

According to the present invention, the cooking tool, which may allow a consumer to know a cooking temperature of food which is cooked or a cooking time of food which is cooked, may be provided.

Also, according to the present invention, the cooking tool, which may uniformly maintain a cooking temperature of food which is cooked or control a cooking time of food which is cooked, may be provided.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Meanwhile, elements or control method of apparatuses which will be described below are only intended to describe the embodiments of the present invention and are not intended to restrict the scope of the present invention. Wherever possible, the same reference numbers will be used throughout the drawings to refer to the same or like parts.

Figure 1A:
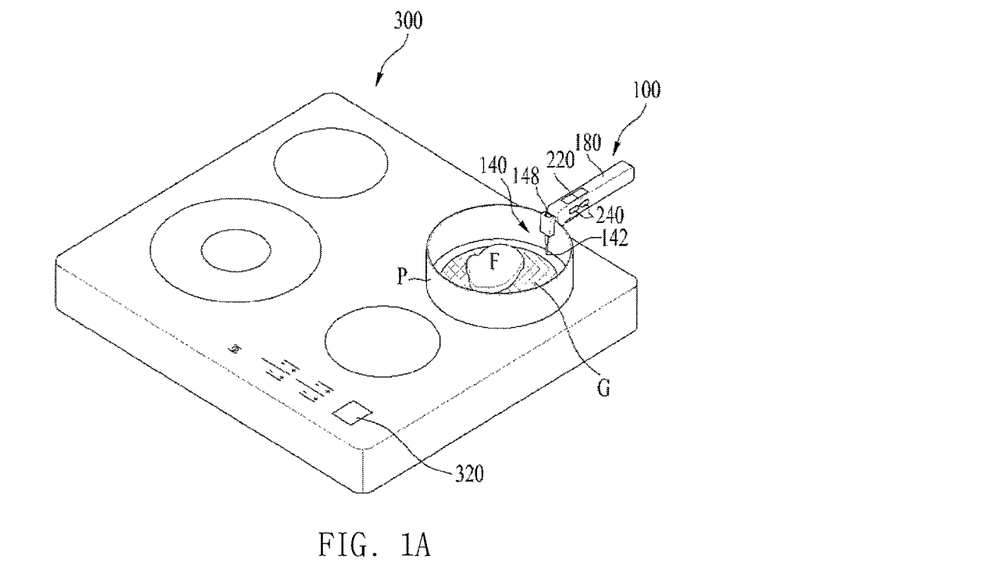
FIG. 1A is a perspective view illustrating a cooking tool 100 interworking with a kitchen appliance 300 according to one embodiment of the present invention.
Figure 1B:
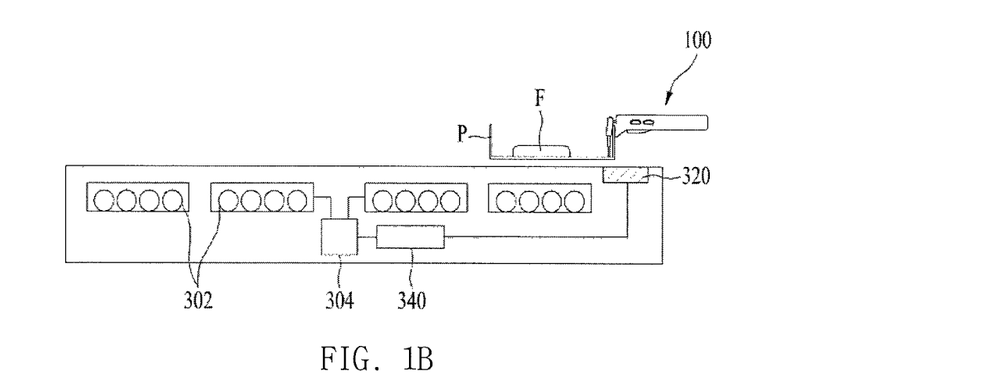
FIG. 1B is a conceptual view illustrating a cooking tool 100 interworking with a kitchen appliance 300 according to one embodiment of the present invention.

FIG. 1A is a perspective view illustrating a cooking tool 100 interworking with a kitchen appliance 300 according to one embodiment of the present invention. FIG. 1B is a conceptual view illustrating a cooking tool 100 interworking with a kitchen appliance 300 according to one embodiment of the present invention. Hereinafter, the cooking tool 100 interworking with the kitchen appliance 300 according to one embodiment of the present invention will be described with reference to FIGS. 1A and 1B.

The cooking tool 100 of the present invention includes a fastening portion 120 detachably provided in a cooking vessel P provided above or inside the kitchen appliance 300 to cook food, a sensor 140 sensing a temperature of food F which is cooked in the cooking vessel P, a transmitter 160 transmitting temperature information sensed by the sensing unit 140 to the kitchen appliance 300 as an electric signal, and a controller 200 controlling the transmitter 160 to transmit the temperature information sensed by the sensor 140 as the electric signal.

Meanwhile, the kitchen appliance 300 includes a receiver 320 receiving the electric signal transmitted from the transmitter 160, and a kitchen appliance controller 340 controlling cooking intensity of food.

That is, the present invention is characterized in that the controller 200 of the cooking tool 100 controls the transmitter 160 to transmit the temperature information sensed by the sensor 140 to the receiver 320 of the kitchen appliance 300, and the kitchen appliance controller 340 controls cooking intensity of food.

The transmitter 160 and the receiver 320 may use the wireless communication technology. Bluetooth, Radio Frequency Identification (RFID), infrared Data Association (IrDA), Ultra Wideband (UWB), ZigBee, etc. may be used for the wireless communication applicable to the present invention.

Cooking intensity of food is varied depending on a type of the kitchen appliance 300. For example, cooking intensity of food in case of a gas range refers to intensity of flame generated from gas combusted by control of gas supply, cooking intensity of food in case of a microwave oven refers to intensity of amplitude of micro wave, and cooking intensity of food in case of an inductor means that intensity of a current flowing in a coil is varied to vary intensity of an electric field generated from the coil.

Therefore, in the present invention, the kitchen appliance 300 may automatically control cooking intensity of food depending on a temperature of food F, which is cooked inside the cooking vessel P, even without a separate manipulation of a user, or may appropriately cook food so as not to be burned or undercooked by removing energy provided from the cooking tool.

Figure 2:
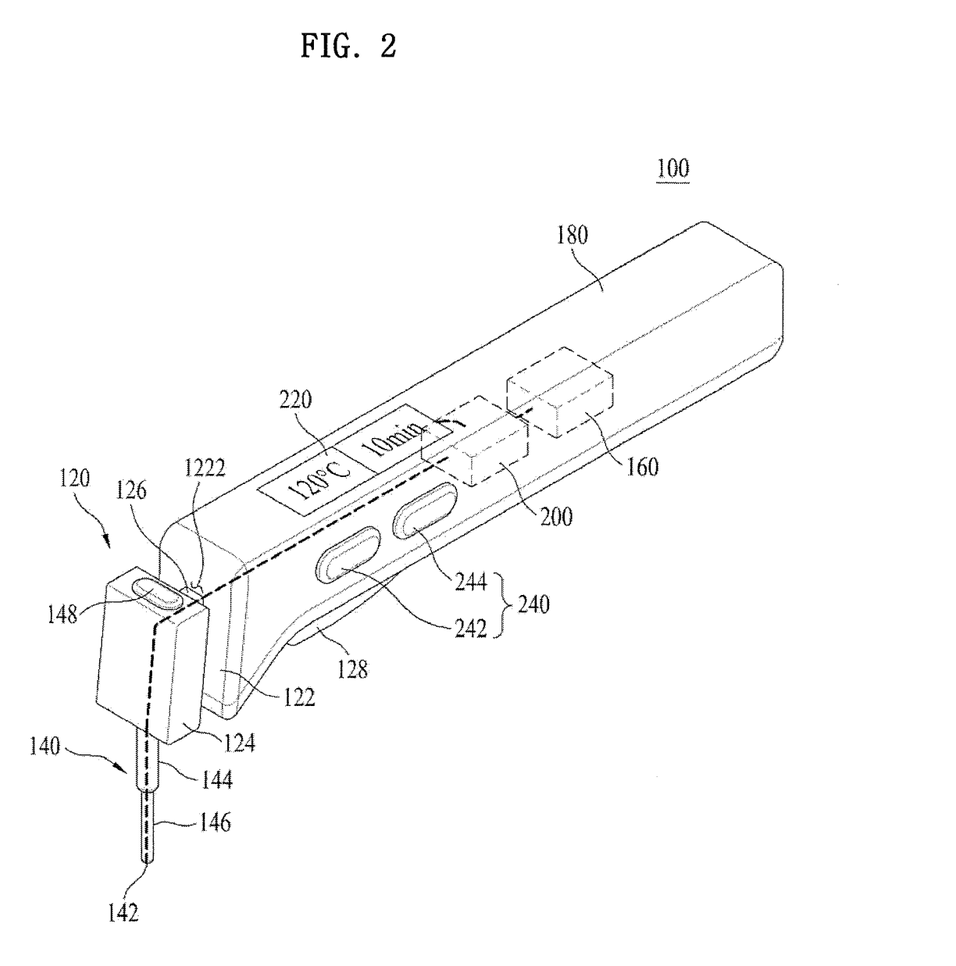
FIG. 2 illustrates a cooking tool according to one embodiment of the present invention.
Figure 3:
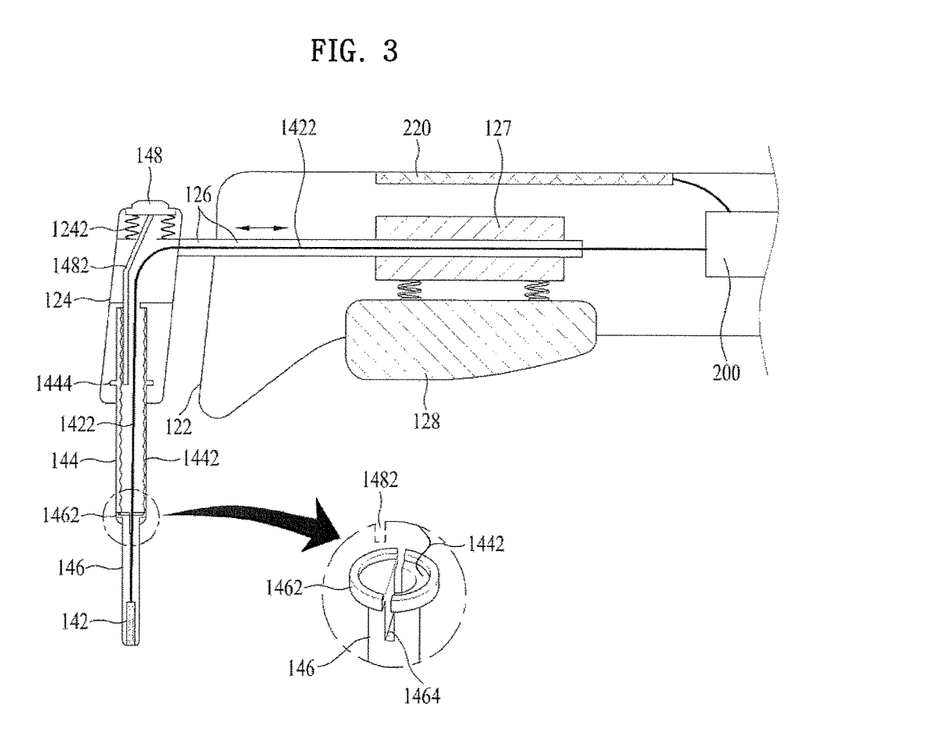
FIG. 3 illustrates a part of a cooking tool according to one embodiment of the present invention.
Figure 4:
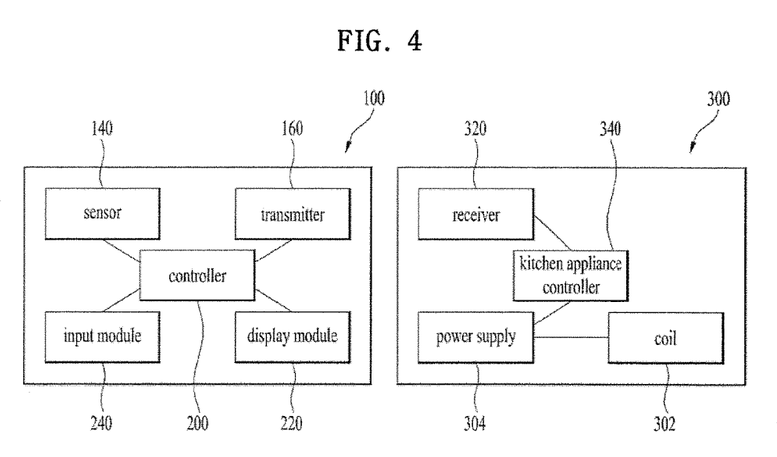
FIG. 4 is a conceptual block diagram illustrating a cooking tool and a kitchen appliance according to one embodiment of the present invention.

Hereinafter, the cooking tool 100 of the present invention will be described in detail and will be followed by the kitchen appliance 300 of the present invention. FIG. 2 illustrates a cooking tool according to one embodiment of the present invention. FIG. 3 illustrates a part of a cooking tool according to one embodiment of the present invention. FIG. 4 is a conceptual block diagram illustrating a cooking tool and a kitchen appliance according to one embodiment of the present invention.

Referring to FIGS. 2 and 3, the fastening portion 120 of the present invention detachably provided in the cooking vessel P provided on or inside the kitchen appliance 300 to cook food.

Meanwhile, the present invention may further include an extension portion 180 extended from the fastening portion 120, serving as a handle to allow a user to hold. In other words, the extension portion 180 may become a handle of the cooking vessel P when the fastening portion 120 of the cooking tool 100 is attached and fixed to the cooking vessel P, and the user may move the cooking vessel P by holding the extension portion 180. Preferably, the extension portion 180 is made of a thermosetting plastic which allows heat of the cooking vessel P not to be conducted thereto and is not deformed by heat.

The fastening portion will be described again. The fastening portion 120 serves to fix or detach the cooking tool 100 to or from the cooking vessel P. The fastening portion 120 is fixed to an upper side at a side of the cooking vessel P. The fastening portion 120 is provided to control an interval to be fixed to inner and outer circumferences of the cooking vessel P in simultaneous contact with the inner and outer circumferences of the cooking vessel P.

The fastening portion 120 includes a support 122 supporting the outer circumference of the cooking vessel P, a pressurizer 124 fixing the inner circumference of the cooking vessel P, and a connector 126 connecting the support 122 with the pressurizer 124.

The support 122 may be made of one end of the extension portion 180. That is, one end of the extension portion 180 becomes the support 122. The support 122 and the extension portion 122 are titled separately in view of their conceptual aspects but are members formed in a single body.

The pressurizer 124 is provided in a plate shape to be in surface-contact with the inner circumference of the cooking vessel P, and is preferably made of a thermosetting plastic material, which is not deformed by heat, and to which heat is conducted.

A length of the connector 126 may be controlled, whereby an interval between the support 122 and the pressurizer 124 may be controlled to fix the cooking vessel P between the support 122 and the pressurizer 124. The connector 126 is preferably made of a thermosetting plastic material which is not deformed by heat.

One end of the connector 126 may enter the support 122 through an inlet 1222 provided in the support 122, and the other end of the connector 126 is fixedly connected to the pressurizer 124.

The extension portion 180 includes a fastening button 128 that may control the length of the connector 126, and a length controller 127 connected with the fastening button 128 and provided thereinside.

The fastening button 128 is provided below the extension portion 180, and is provided to be pressed toward the inside of the extension portion 180. The length controller 127 is connected to the bottom of the fastening button exposed toward the outside of the extension portion, and the connector 126 is provided to pass through the length controller 127.

The length controller 127 serves to move the connector 126 to a left side or right side in accordance with the number of pressing times of the fastening button 128. For example, if the fastening button is pressed once, the length controller 127 moves the connector 126 to the right side, and if the fastening button is pressed twice, the length controller 127 moves the connector 126 to the left side. Therefore, if the fastening button is pressed once, the connector 126 enters the extension portion 180 through the inlet 1222, and the interval between the pressurizer 124 and the support 122 becomes narrow, whereby the side of the cooking vessel P may be fastened. Meanwhile, if the fastening button is pressed twice, the connector 126 is discharged out from the inlet 1222, and the interval between the pressurizer 124 and the support 122 becomes wide, whereby fastening of the side of the cooking vessel P is released.

Hereinafter, the sensor, the transmitter and the controller, which are provided in the cooking tool of the present invention, will be described.

The sensor 140 measures a temperature of food F which is cooked in the cooking vessel P.

The sensor 140 is provided in the fastening portion 120 or the pressurizer 124. This is because that the sensor 140 should be close to the food F, which is cooked, if possible, to exactly measure the temperature of the food F.

Although all elements serving as temperature sensors may be used as the sensor 140, it is preferable in the present invention that a thermocouple 142 or an optical sensor (not shown) is used as the sensor 140.

The thermocouple 142 may measure a temperature by measuring a thermal electromotive force generated between two different types of metals due to a temperature difference between the two metals, which is generated if a contact point formed by bonding both ends of the two metals to each other is heated.

If the thermocouple 142 is used as the sensor 140, the contact point of the thermocouple 142 should be in contact with a measurement target to measure the temperature of the food. Therefore, the thermocouple 142 is provided toward the food F which is cooked. That is, since the cooking tool 100 is provided above the cooking vessel P, it is preferable that the thermocouple 142 is provided downwardly toward the food F which is cooked.

The thermocouple 142 is provided to have a length the same as or smaller than a depth of the cooking vessel P. However, if the depth of the cooking vessel P is greater than the length of the thermocouple 142, the temperature of the food F cannot be measured exactly. To solve this problem, the sensor 140 of the present invention includes a length control member that may extend or reduce the length of the sensor 140. Therefore, the temperature of the food F can be measured regardless of the length of the sensor 140 or the depth of the cooking vessel P.

Referring to FIG. 3, the length control member may include a first pipe 144 provided to be protruded from the pressurizer 124, having a hollow therein, a second pipe 146 moving from the hollow of the first pipe 144, and a thermocouple 142 provided inside the second pipe 146.

The thermocouple 142 is provided inside the second pipe 146, its contact point is provided at the other end of the second pipe 146, and the thermocouple 142 is connected to the controller 220 by a power line 1422.

Therefore, if one end of the second pipe 146 is in contact with the food F which is cooked, the contact point of the thermocouple 142 is heated and therefore an electromotive force is generated in the thermocouple 142, and is delivered to the controller 220 through the power line 1422. Then, the controller 220 determines the temperature of the food on the basis of the electromotive force.

An elastic member 1442 may be provided in the hollow of the first pipe 144, and provides an elastic force that pushes one end of the second pipe 146.

A fastening rib 1462 may be provided at one end of the second pipe 146, and serves as a stopper that allows the second pipe 146 not to be fully ejected when the second pipe 146 is ejected from the inside of the hollow of the first pipe 144.

An end of the second pipe 146 provided with the fastening rib 1462 is made of an elastic material, and may be provided such that a diameter of the fastening rib 1462 becomes small when a force is given to the center of the second pipe 146.

In other words, a cutting portion 1464 cut in parallel with a center shaft is provided at the end of the second pipe 146 to allow the diameter of the fastening rib 1462 to be small if a force is given from the outer circumference of the fastening rib 1462 to a center direction.

Therefore, the fastening rib 1462 moves along the hollow in a state that it is pressurized toward the center shaft inside the hollow of the first pipe 144.

Moreover, the present invention may further include a fastening groove 1444 provided inside the first pipe 144 to fasten the fastening rib 1462 of the second pipe 146 if the second pipe 146 is inserted into the first pipe 144, and a fastening release button 148 releasing the fastening rib 1462 from the fastening groove 1444.

The fastening groove 1444 is a groove provided in the hollow of the first pipe 144, and is provided to have a diameter greater than that of the inner circumference of the first pipe. Therefore, if the fastening rib 1462 reaches the fastening groove 1444, a force from the outer circumference to the center direction, which acts on the fastening rib 1462, is removed, whereby the fastening rib 1462 is fixed to the fastening groove 1444.

The fastening release button 148 is provided above the pressurizer 124, and is provided to return to its original position if a force pushed by an elastic member 1242 connected to one side of the fastening release button 148 and supported inside the pressurizer is removed.

Meanwhile, a push portion 1482, which applies a pushing force to the upper side of the second pipe 146, that is, a portion of the second pipe 146 provided with the fastening rib 1462 to detach the fastening rib 1462 from the fastening groove 1444, is provided at one end of the fastening release button 148. That is, if the push portion pushes the upper side of the second pipe 146, the second pipe 146 has elasticity to move toward the cutting portion 1464, whereby the fastening rib 1462 may be detached from the fastening groove 1444 and then the second pipe 146 moves along the hollow of the first pipe by means of the force of the elastic member 1442.

Therefore, the user who uses the cooking tool of the present invention ejects the second pipe toward the outside of the first pipe by pushing the fastening release button if the cooking vessel is deep, whereby the thermocouple may be directly in contact with the food. The user pushes the second pipe into the first pipe if the cooking vessel is not deep, whereby the second pipe may be fixed to the first pipe.

The operation of the length control member of the present invention will be described. If the user pushes the fastening release button 148 to release the fastening rib 1462 from the fastening groove 1444, the second pipe 146 of which one end is forced by the elastic member provided in the hollow of the first pipe 144 is ejected to the outside of the first pipe 144 but is caught in the end of the hollow of the first pipe 144 without being fully ejected by the fastening rib 1462 of the second pipe 146. On the contrary, when the second pipe 146 is inserted into the first pipe 144, the fastening rib 1462 of the second pipe 146 is pushed into the fastening groove 1444 and then fixed thereto.

Meanwhile, the optical sensor is a sensor that measures a temperature of a measurement target by using light. Generally, the optical sensor measures a temperature of a measurement target by using infrared light. If the optical sensor (not shown) is used as the sensor 140, the optical sensor does not need to be in contact with the measurement target and therefore is provided to emit a light source toward food F which is cooked. Therefore, it is preferable that the optical sensor is provided below the pressurizer 124.

Meanwhile, the transmitter 160 transmits the temperature information sensed by the sensor 140 to the kitchen appliance as the electric signal. The transmitter 160 may be provided at one end of the fastening portion 120, or may be provided at one end of the extension portion 180 or inside the extension portion 180.

Meanwhile, the controller 200 receives the temperature information sensed by the sensor 140 and controls the transmitter 160 to transmit the temperature information as the electric signal. Then, the transmitter 160 wirelessly transmits the temperature information as the electric signal by using the aforementioned wireless communication technology.

Meanwhile, the cooking tool 100 of the present invention may include a display module 220 that may display cooking information of food, such as a temperature of food F which is cooked or cooking time of the food F. In this case, the display module 220 may be provided in the extension portion 180, and is connected to the controller 200 and then controlled by the controller 200.

Therefore, if the temperature of the food F which is cooked is sensed by the sensor 140, the controller 200 may control the display module 220 to display corresponding temperature information on a screen of the display module 220. Also, the controller 200 may control the display module 220 to count a time from the time when the temperature of the food sensed by the sensor 140 becomes higher than a predetermined temperature and display the counted time on the screen of the display module 220 as a cooking time of the food F. As a result, in the present invention, the temperature of the food which is cooked and the cooking time may be provided to the user, whereby convenience of cooking may be increased.

Also, the cooking tool 100 of the present invention may include an input module 240 that may allow the user to input cooking information on the food F. Therefore, the controller 200 of the cooking tool 100 is connected to the input module 240, and transmits the electric signal to the transmitter 160 on the basis of the cooking information input by the input module 240 and controls cooking intensity of the food at the kitchen appliance.

The input module 240 may be provided as a button provided in the extension portion 180, or may be provided as a touch screen that allows a user to directly touch the display module 220. If the input module 240 is provided as a button, the input module 240 is provided with a cooking temperature button 242 and a cooking time button 244, and the user may set a predetermined cooking temperature and a predetermined cooking time in accordance with the number of pressing times of the cooking temperature button and the cooking time button.

For example, the predetermined cooking temperature may include temperatures such as 50°, 60°, 70°, 80°, 90°, and 100°, and is varied whenever the cooking temperature button 242 is pressed once. Also, the predetermined cooking time may include time such as 5 minutes, 10 minutes, 15 minutes, 20 minutes, and 1 hour, and is varied whenever the cooking time button 244 is pressed once.

Meanwhile, the kitchen appliance 300 provided in the present invention includes all of machines or tools, which use electricity or gas and are used or arranged in the kitchen, such as a gas range, a microwave oven, and an induction. Hereinafter, the kitchen appliance 300 provided as an induction will be described.

As described above, the kitchen appliance 300 of the present invention includes a receiver 320 receiving the electric signal transmitted from the transmitter 160, and a kitchen appliance controller 340 controlling cooking intensity of food. Therefore, the kitchen appliance may allow its controller to control cooking intensity of food on the basis of the received electric signal.

Referring to FIG. 1B, the induction 300 which is an example of the kitchen appliance 300 of the present invention includes a coil 302 generating an induced magnetic field if a current is supplied thereto, and a power supply 304 that may control intensity of a current flowing in the coil 302.

A cooking vessel P to which the cooking tool 100 of the present invention is fixed is arranged on the upper surface of the induction 300, and the coil 302 is provided inside the induction 300 to correspond to the cooking vessel P. The induced magnetic field generated by the coil 302 as the current is supplied to the coil 302 is generated toward the cooking vessel P. Therefore, an induced current is generated in the cooking vessel P by the induced magnetic field, and the cooking vessel P becomes a resistant body with respect to the induced current to generate heat, whereby the food inside the cooking vessel P is heated and cooked by heat.

In this case, the cooking vessel P should be made of a metal material that may generate an induced current by means of an induced magnetic field. Alternatively, the present invention may further include a grill G that is provided inside the cooking vessel P and may generate an induced current by means of an induced magnetic field. Therefore, the food may be cooked using the induction 300 regardless of the type of the cooking vessel P.

The power supply 304 is connected to the kitchen appliance controller 340, and is provided to control intensity of the current flowing in the coil 302. Therefore, the kitchen appliance controller 340 may control intensity of the current flowing in the coil 302 by controlling the power supply 304 in accordance with the electric signal transmitted from the cooking tool 100.

Therefore, if a current with weak intensity is supplied from the power supply 304, intensity of the induced magnetic field becomes weak, whereby the induced current generated by the cooking vessel P becomes weak, and heat energy supplied to the food which is cooked also becomes small, whereby cooking intensity of the food becomes weak. On the contrary, if intensity of the current becomes strong, cooking intensity of the food also becomes strong.

Figure 5:
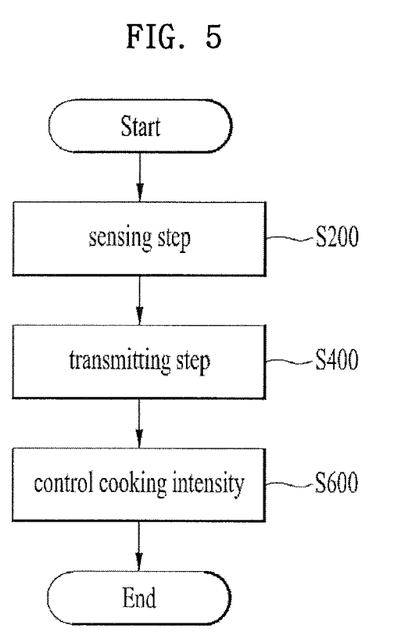
FIG. 5 is a flow chart illustrating a control method of a cooking tool interworking with a kitchen appliance of the present invention.
Figure 6:
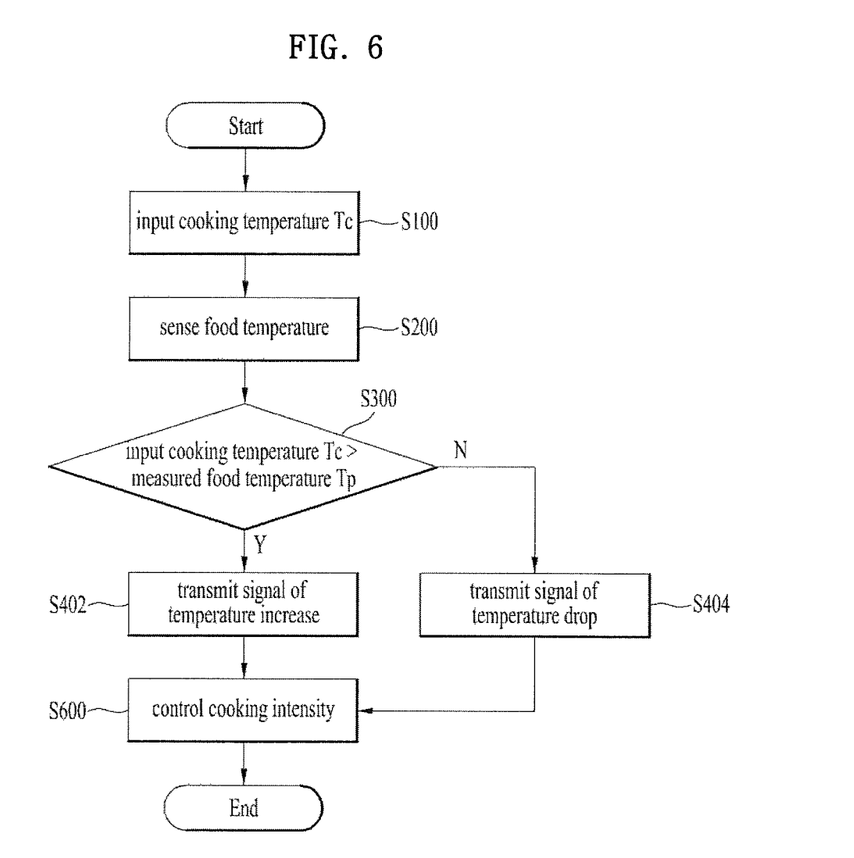
FIG. 6 is a flow chart illustrating an algorithm for controlling a cooking temperature in a control method of a cooking tool interworking with a kitchen appliance of the present invention.
Figure 7:
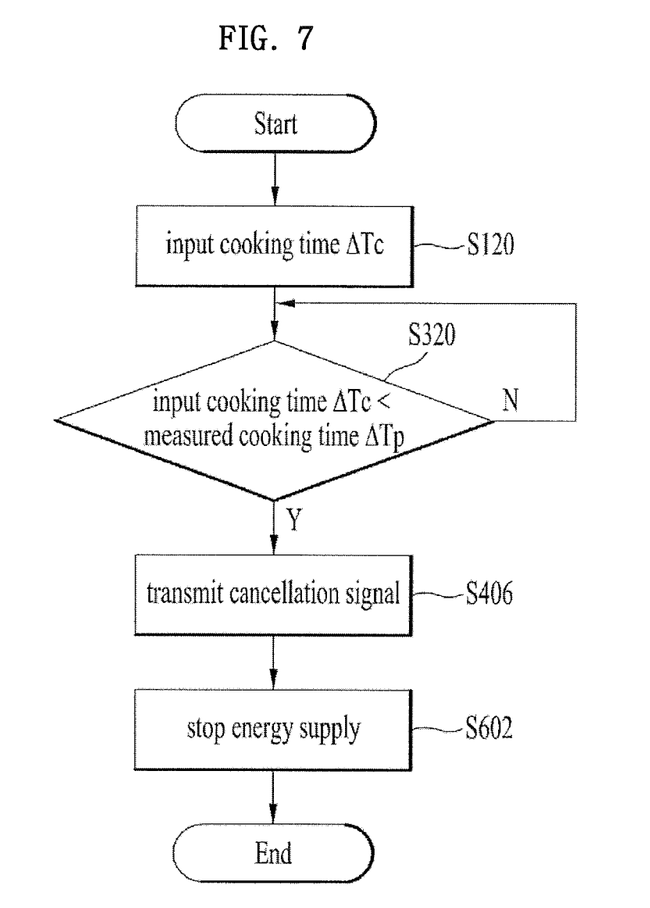
FIG. 7 is a flow chart illustrating an algorithm for controlling a cooking time in a control method of a cooking tool interworking with a kitchen appliance of the present invention.

FIG. 5 is a flow chart illustrating a control method of a cooking tool interworking with a kitchen appliance of the present invention. FIG. 6 is a flow chart illustrating an algorithm for controlling a cooking temperature in a control method of a cooking tool interworking with a kitchen appliance of the present invention. FIG. 7 is a flow chart illustrating an algorithm for controlling a cooking time in a control method of a cooking tool interworking with a kitchen appliance of the present invention.

Hereinafter, the control method of the cooking tool interworking with the kitchen appliance of the present invention will be described with reference to FIG. 5.

The present invention relates to the control method of the cooling tool 100 attached to the cooking vessel P provided on or inside the kitchen appliance 300, interworking with the kitchen appliance 300. This control method includes a sensing step S200 of sensing a temperature of food which is cooked in the cooking vessel P, a transmitting step S400 of transmitting the sensed temperature of the food to the kitchen appliance as an electric signal, and a controlling step S600 of controlling cooking intensity of food in the kitchen appliance by receiving the electric signal.

Therefore, energy (heat, electromagnetic wave, etc.) provided from the kitchen appliance to the cooking vessel is controlled depending on a temperature of food which is cooked, whereby the food which is cooked may be prevented from being burned or undercooked. Hereinafter, a detailed embodiment will be described.

The control method of the cooking tool interworking with the kitchen appliance according to the present invention may further include an inputting step of inputting cooking information of food from a user.

Referring to FIG. 6, the inputting step may include an inputting step S100 of allowing a user to input a cooking temperature Tc suitable for food which is cooked, through the input module 240. Referring to FIG. 7, the inputting step may include an inputting step S120 of allowing a user to input a cooking time ΔTc through the input module 240.

If the input module 240 is a touch screen (not shown) provided in the display module 220, the user may input the cooking temperature and/or the cooking time by touching the touch screen. Also, if the input module 240 is a button, the user may set the cooking temperature of the food F which is cooked, by pressing the cooking temperature button 242 or set the cooking time of the food F which is cooked, by pressing the cooking time button 244.

Hereinafter, a control method of maintaining a cooking temperature suitable for food in the present invention will be described.

As shown in FIG. 6, the control method of the present invention includes a temperature comparing step S300 of comparing the cooking temperature Tc input at the inputting step with a food temperature Tp sensed by the sensor, and the controller controls the transmitter 160 to transmit (S402) an electric signal of temperature increase to the kitchen appliance 300 if the cooking temperature Tc is greater than the sensed food temperature Tp at the temperature comparing step S300, and controls the transmitter 160 to transmit (S404) an electric signal of temperature drop to the kitchen appliance 300 if the cooking temperature Tc is smaller than the sensed food temperature Tp at the temperature comparing step S300.

In this case, the kitchen appliance 300 receives the electric signal through the receiver 320, and allows cooking intensity of food to be increased through the kitchen appliance controller 340 in case of the electric signal of temperature increase and allows cooking intensity of food to be reduced in case of the electric signal of temperature drop (S600). That is, if the kitchen appliance 300 is provided as an induction, the kitchen appliance controller 340 flows much current in the coil 302 in case of the electric signal of temperature increase to supply much heat to the food inside the cooking vessel, and flows less current in the coil 302 in case of the electric signal of temperature drop to reduce heat supplied to the food inside the cooking vessel.

Therefore, the temperature of the food which is cooked in the cooking vessel P may be set to the cooking temperature Tc input by the user, taste of the food which is cooked at a suitable temperature becomes good, and the food may be prevented from being burned or undercooked.

Hereinafter, a control method of cooking food by setting a cooking time in the present invention will be described.

Referring to FIG. 7, the control method of the present invention includes a time comparing step S320 of comparing an input cooking time ΔTc with a measured cooking time ΔTp.

The measured cooking time ΔTp means a time counted by the controller 200 of the cooking tool 100. In this case, a start point of the cooking time which is counted means the time when a food temperature measured by the sensor 140 is higher than a predetermined temperature. For example, if the predetermined temperature is set to 40°, the time is counted in a unit of second from the time when the sensed temperature of food sensed by the sensor 140 exceeds 40°, whereby the time when the food is cooked is measured. The controller 200 controls the transmitter 160 to transmit a cancellation signal to the kitchen appliance 300 if the input cooking time ΔTc is longer than the measured cooking time ΔTp (S406).

In this case, the kitchen appliance 300 stops supply of energy (heat, electromagnetic wave, etc.) from the kitchen appliance 300 to the cooking vessel P by receiving the cancellation signal from the receiver 320 (S602).

That is, if the kitchen appliance 300 is provided as an induction 300, the kitchen appliance controller 340 controls the power supply 304 so as not to supply the current to the coil 302, whereby the induction 300 does not generate the induced magnetic field any more and the induced current is not generated by the cooking vessel P so as not to heat the food inside the cooking vessel P.

Therefore, the cooking tool, which may cook food for a cooking time suitable for the food and is provided to turn off an induction 300 after a time input by a user, may be provided.

The user may cook food at a proper temperature for a proper time even though a separate operation is not made for the food, which starts to be cooked, by previously inputting a cooking temperature Tc and/or a cooking time ΔTc in accordance with the aforementioned control method of the present invention.

Meanwhile, as described above, at the inputting steps S100 and S120, any one of the cooking temperature Tc and the cooking time ΔTc may be input or both of them may be input simultaneously. For example, if the cooking temperature is input as 100° but the cooking time is not input, the food F which is cooked is heated while being maintained uniformly at 100°. Alternatively, if the cooking temperature is input as 100° and the cooking time is input as 35 minutes, the food F which is cooked is heated at 100° for 35 minutes and then energy source is removed (current supplied from the power supply of the induction to the coil is cut off).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A cooking tool comprising:
    a fastening portion detachably provided in a cooking vessel provided above or inside a kitchen appliance that is configured to cook food;
    an extension portion extended from the fastening portion and configured to provide a handle for a user;
    a sensor configured to sense a temperature of food which is cooked in the cooking vessel;
    a transmitter configured to transmit temperature information sensed by the sensor to the kitchen appliance as an electric signal; and
    a controller configured to control the transmitter to transmit the temperature information sensed by the sensor as an electric signal,
    wherein the fastening portion comprises a pressurizer configured to fix the inner circumference of the cooking vessel, a support provided on one end of the extension portion and configured to support the outer circumference of the cooking vessel, and a connector configured to connect the support with the pressurizer,
    wherein one side of the cooking vessel is fixed between the pressurizer and the support, and wherein the sensor comprises a first pipe having a hollow interior and configured to protrude downward from the pressurizer, a second pipe that extends from the hollow interior of the first pipe, and a thermocouple provided inside the second pipe and configured to be in contact with food that is cooked in the kitchen appliance.

2. The cooking tool according to claim 1, wherein the controller is further configured to control the transmitter to transmit the sensed temperature information to a receiver of the kitchen appliance.

3. The cooking tool according to claim 2, wherein the sensor is provided as a thermocouple.

4. The cooking tool according to claim 2, further comprising a display module controlled by the controller to display cooking information of food.

5. The cooking tool according to claim 2, further comprising an input module configured to receive a user input regarding cooking information, wherein the input module is configured as a button provided in the extension portion.

6. The cooking tool according to claim 1, wherein the cooking vessel is made of a material that flows an induced current by means of an induced magnetic field, or the cooking tool comprises a grill provided inside the cooking vessel and made of a material that flows an induced current by means of an induced magnetic field.

* * * * *